(12) United States Patent
Rojas Calvente et al.

(10) Patent No.: US 12,506,539 B2
(45) Date of Patent: Dec. 23, 2025

(54) METHOD FOR BEAM ALIGNMENT IN POINT-TO-POINT OPTICAL WIRELESS COMMUNICATION SYSTEMS

(71) Applicant: SIGNIFY HOLDING B.V., Eindhoven (NL)

(72) Inventors: Francisco David Rojas Calvente, Eindhoven (NL); Paul Henricus Johannes Maria Van Voorthuisen, Sint Oedenrode (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 239 days.

(21) Appl. No.: 18/557,081

(22) PCT Filed: Apr. 22, 2022

(86) PCT No.: PCT/EP2022/060786
§ 371 (c)(1),
(2) Date: Oct. 25, 2023

(87) PCT Pub. No.: WO2022/229037
PCT Pub. Date: Nov. 3, 2022

(65) Prior Publication Data
US 2024/0214070 A1 Jun. 27, 2024

(30) Foreign Application Priority Data

Apr. 29, 2021 (EP) ..................................... 21171202

(51) Int. Cl.
*H04B 10/00* (2013.01)
*H04B 10/112* (2013.01)
(Continued)

(52) U.S. Cl.
CPC ......... *H04B 10/114* (2013.01); *H04B 10/112* (2013.01)

(58) Field of Classification Search
CPC ... H04B 10/11; H04B 10/112; H04B 10/1121; H04B 10/1123; H04B 10/114;
(Continued)

(56) References Cited

U.S. PATENT DOCUMENTS

| 8,334,898 B1 | 12/2012 | Ryan et al. |
| 9,203,524 B2 | 12/2015 | Simpson et al. |

(Continued)

FOREIGN PATENT DOCUMENTS

| CN | 108400816 A | 8/2018 |
| WO | 2020169378 A1 | 8/2020 |

*Primary Examiner* — Daniel G Dobson

(57) ABSTRACT

A transmitter (100) for use in an optical wireless communication system, the transmitter (100) comprising a main optical transmitter front end (150) configured to send data on a first frequency band to a remote receiver (200) for data communication; and send a beacon signal on a first frequency channel to the remote receiver (200); a plurality of auxiliary optical transmitter front ends (160*a*, 160*b*, 160*c*) configured to send beacon signals on the first frequency channel to the remote receiver (200); wherein the beacon signals sent by the main (150) and the auxiliary optical transmitter front ends (160*a*, 160*b*, 160*c*) are used to assist a beam alignment procedure between the main optical transmitter front end (150) and the remote receiver (200) for data communication; and a first controller (109) configured to generate individual beacon signals for the main and the plurality of auxiliary optical transmitter front ends according to a synchronous CDMA method, with each beacon signal comprising a unique identifier corresponding to the main and the plurality of auxiliary optical transmitter front ends respectively.

15 Claims, 6 Drawing Sheets

(51) Int. Cl.
*H04B 10/114* (2013.01)
*H04J 14/00* (2006.01)

(58) Field of Classification Search
CPC ............ H04B 10/1141; H04B 10/1143; H04B 10/116; H04B 10/118
See application file for complete search history.

(56) References Cited

U.S. PATENT DOCUMENTS

| | | |
|---|---|---|
| 11,159,235 B1 * | 10/2021 | Nykolak ............ H04B 10/1143 |
| 2007/0031151 A1 | 2/2007 | Cunningham et al. |
| 2014/0376914 A1 | 12/2014 | Miniscalco |

* cited by examiner

METHOD FOR BEAM ALIGNMENT IN POINT-TO-POINT OPTICAL WIRELESS COMMUNICATION SYSTEMS

CROSS-REFERENCE TO PRIOR APPLICATIONS

This application is the U.S. National Phase application under 35 U.S.C. § 371 of International Application No. PCT/EP2022/060786, filed on Apr. 22, 2022, which claims the benefit of European Patent application Ser. No. 21/171, 202.1, filed on Apr. 29, 2021. These applications are hereby incorporated by reference herein.

FIELD OF THE INVENTION

The invention relates to the field of communication methods. More particularly, various methods, apparatus, systems, and computer-readable media are disclosed herein related to a method for beam alignment in point-to-point optical wireless communication systems.

BACKGROUND OF THE INVENTION

To enable more and more electronic devices like laptops, tablets, and smartphones to connect wirelessly to the Internet, wireless communication confronts unprecedented requirements on data rates and also link qualities, and such requirements keep on growing year over year, considering the emerging digital revolution related to Internet-of-Things (IoT). Radio frequency technology like Wi-Fi has limited spectrum capacity to embrace this revolution. In the meanwhile, light fidelity (Li-Fi) is drawing more and more attention with its intrinsic security enhancement and capability to support higher data rates over the available bandwidth in visible light, Ultraviolet (UV), and Infrared (IR) spectra.

However, to establish a point-to-point optical wireless communication link with a high data rate over a large separate distance, the optical wireless communication system or Li-Fi system is usually of narrow beam angles (in the order of a few degrees), resulted from the properties of light sources as well as a practical power budget. Furthermore, to achieve such a high-speed link reliably, the two remote communication devices need to be aligned precisely, which may be challenging due to the combination of the narrow beam width and the large separation. To assist this alignment, different methods have been proposed, that involve the aid of a camera or to use feedback information from the remote device. These systems suffer from a long latency to reach a final alignment.

US2007031151A1 is related to a method for acquiring and tracking terminals in a free-space laser communication system involves exchanging beacon laser beams between the terminals and then track the terminals such that data laser beams exchanged by the terminals for communication are steered based on feedback from detection of the beacon laser beams.

SUMMARY OF THE INVENTION

The inventors recognize that the long latency on beam alignment with existing solutions is not desirable, or even not acceptable, for many applications, considering that such a beam alignment procedure shall be triggered whenever there is a change on a relative position between the two remote devices.

In view of the above, the present disclosure is directed to methods, apparatus, systems, computer program and computer-readable media for providing a solution to speed up the beam alignment procedure between two remote devices. With the addition of low-cost low-bandwidth out-of-band emitters around a main emitter at a transmitter side, extra information can be provided to a remote receiver side for deriving the relative beam positioning information, which can be used to assist the remote receiver to adjust its position accordingly.

More particularly, the goal of this invention is achieved by a transmitter as claimed in claim 1, by a receiver as claimed in claim 9, by an optical wireless communication system as claimed in claim 12, by a method of a transmitter as claimed in claim 13, by a method of a receiver as claimed in claim 14, and by a computer program as claimed in claim 15.

In accordance with a first aspect of the invention a transmitter is provided. A transmitter for use in an optical wireless communication system, the transmitter comprises: a main optical transmitter front end configured to send data on a first frequency band to a remote receiver for data communication; and send a beacon signal on a first frequency channel to the remote receiver; a plurality of auxiliary optical transmitter front ends configured to send beacon signals on the first frequency channel to the remote receiver; wherein the beacon signals sent by the main and the auxiliary optical transmitter front ends are used to assist a beam alignment procedure between the main optical transmitter front end and the remote receiver for data communication; and a first controller configured to generate individual beacon signals for the main and the plurality of auxiliary optical transmitter front ends according to a synchronous CDMA method, with each beacon signal comprising a unique identifier corresponding to the main and the plurality of auxiliary optical transmitter front ends respectively; wherein there is an overlap between coverage areas of the main and the auxiliary optical transmitter front ends, and the combined coverage areas are centered at the coverage area of the main optical transmitter front end.

The main optical transmitter front end comprises at least a light source. The light source may be one of a light-emitting diode (LED), a laser diode, or a vertical-cavity surface-emitting laser (VCSEL). The main optical transmitter front end is configured to carry out high-speed data communication with a remote device on a first frequency band. The first frequency band is an optical band, such as in visible light, Ultraviolet (UV), and Infrared (IR) spectra. The main optical transmitter front end is further configured to send out beacon signals on a first frequency channel.

In addition to the main optical transmitter front end, the transmitter further employs a plurality of auxiliary optical transmitter front ends to send out beacon signals on the first frequency channel. Beacons signals sent by the main and the plurality of auxiliary optical transmitter front ends are used to facilitate a beam alignment procedure between the transmitter and a remote receiver. The coverage area of the main optical transmitter front end has an overlap with the coverage areas of the auxiliary optical transmitter front ends, with the combined coverage areas centered at the coverage area of the main optical transmitter front end.

The multiple emitters at the transmitter side use the same first frequency channel to send out beacon signals to the intended remote receiver. With each beacon signal comprising a unique identifier of a corresponding emitter, upon receiving one or more beacon signals, the remote receiver can derive a relative position it is pointing as compared to the multiple emitters at the transmitter side. Therefore, the beacon signals are used to assist beam tracking.

It is desirable that the beacon signals from multiple emitters are sent simultaneously instead of sequentially to avoid extra latency. To deal with mutual interference among the multiple emitters in an overlap reception area at the remote receiver side, the multiple emitters are configured to send the beacon signals according to a synchronous Code-division multiple access (CDMA) method, where multiple transmitters send information over a single communication channel simultaneously using a spread spectrum technique. CDMA has been used for decades in different mobile wireless systems allowing communication between multiple Access Points (AP) and end users where a common channel that shares the same band of frequencies is used. As the coverage of these APs may overlap, the concurrent transmission may lead to interference at an end user. Each interfering transmitter is assigned a different spreading code, which is a unique pseudo-random binary sequence. In a synchronous CDMA system, these sequences are orthogonal to each other and used to encode information bits by multiplying each bit with a full sequence of spreading code. In this way, the generated chip sequence is much longer than the original information bit sequence, producing a spread-spectrum signal that is robust against interference. In the receiver, a simple method for recovering the original signal is to cross-correlate the received signal with the possible spreading sequences that are designed in the system (all sequences that can be used by different potential transmitters).

In a preferred setup, the first frequency channel is outside the first frequency band.

The first frequency band is used for high-speed data communication, such as according to an optical wireless communication standard. Thus, the channel allocation in the first frequency band may be compliant to an IEEE 802.11 standard (e.g., IEEE802.11bb) or an ITU G.9991 standard regarding high-speed optical wireless data communication, with each channel in the first frequency band of a relatively large bandwidth (20 MHz or more). In the meanwhile, the beacon signals are of much lower data rate as compared to data communication, it is beneficial to use a narrow signaling channel as the first frequency channel. Such arrangement reduces the power consumption at the transmitter side for sending the beacons and processing complexity at the remote receiver side. Preferably, the first frequency channel is an out-of-band channel with regard to the optical data communication. Using an out-of-band signaling channel also avoids extra overhead on data communication bandwidth.

Advantageously, the main optical transmitter front end has a beam angle not larger than 20 degrees, and each auxiliary optical transmitter front end has a beam angle larger than that of the main optical transmitter front end.

Beam angle or beam width is the aperture angle from where most of the transmission power is radiated. For example, the half power beam width is the angle between the half-power (−3 dB) points of the main lobe of the radiation pattern. For the horizontal plane, beam angle or beam width is usually expressed in degrees.

For high-speed optical wireless communication addressed in the present invention, it is preferable that the main optical transmitter front end has a narrow beam, which is not larger than 20 degrees. And even more beneficially, the narrow beam is in the order of 1 to 5 degrees half-angle. Such narrow beam is of practical consideration to support long distance and high data rate communication within a reasonable power budget.

On the other hand, the auxiliary optical transmitter front ends are used to send low data rate beacon signals on the out-of-band signaling channel, which is less power demanding. Therefore, it is beneficial for each auxiliary optical transmitter front end to have a larger beam angle than that of the main optical transmitter front end to simplify the beam alignment procedure.

Preferably, the plurality of auxiliary optical transmitter front ends comprises at least three auxiliary optical transmitter front ends.

The number of auxiliary optical transmitter front ends deployed in the transmitter is a design trade off. With a larger number of auxiliary optical transmitter front ends, the detection of relative beam position between the two remote devices can be more accurate. Accordingly, it can speed up the beam alignment procedure. However, the cost and size at the transmitter side, as well as the processing complexity at the remote receiver side represent a corresponding penalty. Therefore, the number of auxiliary optical transmitter front ends used in a practical system may depend on an application requirement.

Beneficially, a coverage area of each auxiliary optical transmitter front end has an overlap with at least one other auxiliary optical transmitter front end.

An arrangement of overlapped beam patterns among the plurality of auxiliary optical transmitter front ends can be used to assist with the identification of a more precise area where the receiver is pointing to. For example, when the two adjacent auxiliary optical transmitter front ends have an overlapping coverage area, a remote receiver receiving the signal along the middle line of the overlap coverage area, will detect the beacon signals from both auxiliary optical transmitter front ends with equal received signal strength. And hence, following that line the beam tracking follows a direct path towards the center coverage area, which corresponds to the main optical transmitter front end.

Advantageously, the controller is configured to use the unique identifiers as spreading codes according to the CDMA method to generate beacon signals for the main and the auxiliary optical transmitter front ends, respectively.

According to the multiple access method of CDMA, the controller compiles beacon signals for each one of the main optical transmitter front end and the auxiliary optical transmitter front ends by spreading a message with a unique chip sequence, and the unique chip sequences shall be orthogonal to each other. Therefore, it is beneficial for the controller to use the unique identifiers of the main and the auxiliary optical transmitter front ends as spreading codes to generate the beacon signals. Different messages may be used for different beacon signals to carry additional information. It is also an option to use a same message in compiling the beacons signals. To further improve power efficiency of the system, the message may be a single bit message. And then, the beacon signals are of the same length as the spreading codes or the identifiers.

As disclosed above, there is an overlap between coverage areas of the main and the auxiliary optical transmitter front ends, with the combined coverage areas centered at the coverage area of the main optical transmitter front end. There may be different arrangements with regard to the deployment of the coverage areas of the auxiliary optical transmitter front ends around the coverage area of the main optical transmitter front end.

In one setup, the plurality of auxiliary optical transmitter front ends is configured to generate concentric overlapped coverage areas.

In this setup, the coverage areas of the main and the combined auxiliary optical transmitter front ends share a same center, with the coverage area of the main optical transmitter front end fully covered by the coverage areas of all the auxiliary optical transmitter front ends. For the more than one auxiliary optical transmitter front ends, the coverage area of an inner one is also fully covered by an outer one.

In another setup, the plurality of auxiliary optical transmitter front ends is configured to generate equal coverage area sections around an optical axis centered by the coverage area of the main optical transmitter front end, with a partial overlap between any two adjacent sections.

In this alternative setup, the plurality of auxiliary optical transmitter front ends is configured to generate coverage areas with the same pattern but directed to different directions around the coverage area of the main optical transmitter front end. Furthermore, the auxiliary optical transmitter front ends are configured to have a partial overlap between any two adjacent coverage area sections emitted by different auxiliary optical transmitter front ends. In one example, with four auxiliary optical transmitter front ends, quadrantally partially overlapped coverage areas are generated around the coverage area of the main optical transmitter front end.

In accordance with a second aspect of the invention a receiver is provided. A receiver for use in an optical wireless communication system, the receiver comprises a rotatable optical receiver front end configured to receive data on a first frequency band from a remote transmitter for data communication, and detect one or more beacon signals sent by the remote transmitter on a first frequency channel according to a synchronous CDMA method, with each beacon signal comprising a unique identifier corresponding to a main optical transmitter front end or one or more auxiliary optical transmitter front ends of the remote transmitter respectively; and a second controller configured to assist a control on adjusting the rotatable optical receiver front end to align with the remote transmitter for data communication according to the detection of the one or more beacon signals.

The beam alignment is implemented at the receiver side, with at least the optical receiver front end rotatable. It may be an option that the receiver is installed on some type of mounting device that allows it to rotate in one or more axis to find the correct alignment. It may also be an option that only the optical receiver front end is mounted on an actuator instead of the entire receiver.

The rotatable optical receiver front end is configured to receive data on the first frequency band for data communication, and also to detect one or more beacon signals on a first frequency channel for beam alignment. With beacon signals sent according to a synchronous CDMA method, the receiver is able to receive more than one beacon signal simultaneously. Since each beacon signal comprises a unique identifier of a corresponding emitter belonging to the same transmitter, upon receiving one or more beacon signals, the controller can derive a relative position that the receiver is pointing as compared to the multiple emitters at the transmitter side, which information is used to assist a control of the rotatable optical receiver front end to align with the remote transmitter for data communication.

In one example, the rotatable optical receiver front end comprises a photodiode; a first transimpedance amplifier, TIA, connected to the photodiode forming a first receiving path; a low pass filter connected to the photodiode; a second TIA connected to the low pass filter forming a second receiving path; wherein the first receiving path is configured to receive communication data, and the second receiving path is configured to detect presence of one or more beacon signals.

A photodiode is a semiconductor device that coverts light into electric current or voltage based on the operation mode of the device. Sometimes a photodiode is also called as a photo detector, a light detector, or a photo sensor. A photodiode may contain optical filters, built-in lenses, and may have large or small surface areas. Depending on the construction of the device, photodiodes can be classified into different types, such as PN photodiode, Schottky photodiode, PIN photodiode, and Avalanche photodiode.

A TIA is a type of current-to-voltage converter, which is commonly used with sensors, when they have a current response that is more linear than a voltage response. TIAs are very often used as a first stage amplifier to condition the received signals of a photodiode. Because the output electrical signal from a photodiode is typically small and therefore difficult to process further, amplification of the signal from the photodiode to a larger signal is beneficial for further processing.

The rotatable optical receiver front end comprises two TIAs, with one supporting wideband high-speed communication and the other supporting narrowband low speed beaconing. Since the two receiving paths are originated from the same light sensor or photodiode, a low path filter is connected between the photodiode and the narrowband TIA allowing only the beacon signals to pass through from the photodiode to the narrowband TIA.

Preferably, the controller is configured to:
a) perform cross correlations between detected signals on the first frequency channel and each one of a set of unique identifiers corresponding to the main optical transmitter front end and a plurality of auxiliary optical transmitter front ends of the remote transmitter respectively;
b) generate, according to correlation results, a control signal for adjusting the rotatable optical receiver front end; and
c) repeat step a)-b) until the correlation result related to the unique identifier of the main optical transmitter front end larger than any other correlation results.

The signals detected on the first frequency channel by the receiver depend on the relative position of the rotatable optical receiver front end and the multiple emitters. When the receiver is completely out of alignment with the remote transmitter, no beacon signals will be detected. This may give an indication that a large step adjustment may be needed. Upon detecting of one or more beacon signals, the controller can derive that the reception area of the receiver is within the combined coverage areas of the multiple emitters of the transmitter. The receiver is aware of the set of unique identifiers corresponding to the main optical transmitter front end and a plurality of auxiliary optical transmitter front ends of the remote transmitter. By performing cross correlation between the detected signal on the first frequency channel and each one of the unique identifiers, the presence of one or more beacons signals and the received signal strengths of each beacon signal can be derived based on the correlation results. When a beacon signal with a certain identifier is detected, a correlation peak will be present in the correlation results with the amplitude of the correlation peak providing an indication on the received signal strength of that beacon signal. Using knowledge of the beam patterns of the multiple emitters and identifying if the receiver is pointing to a certain sub-area of the combined coverage areas of the transmitter, the controller can derive a control signal to indicate how to adjust the position to get closer to the coverage area of the main emitter. After an adjustment is implemented, the receiver may detect again on the first frequency channel for one or more beacons signals to get an updated alignment information in order to confirm the adjustment is according to expectation. And with an iterative detection and adjustment loop, the rotatable optical receiver front end can track and align with the main optical transmitter front end.

In accordance with a third aspect of the invention an optical wireless communication system is provided. The optical wireless communication system comprises a transmitter according to the present invention, and a remote receiver according to the present invention.

In a system with bi-directional communication, the two remote devices may have both transmitting and receiving capabilities. Hence, a first device may have a transmitter according to the present invention and a conventional receiver, and a second device may have a conventional transmitter and a receiver according to the present invention. It may also be an option that both devices comprised the transmitter and the receiver according to the present invention. And then, the beam alignment procedure may be enabled unidirectionally, where one device acts as the transmitter and the other device acts as the receiver during the beam alignment procedure.

In accordance with a fourth aspect of the invention a method of a transmitter is provided. A method of a transmitter in an optical wireless communication system, the method comprises the transmitter sending data on a first frequency band to a remote receiver for data communication by a main optical transmitter front end of the transmitter; and sending a beacon signal on a first frequency channel to the remote receiver by the main optical transmitter front end; sending beacon signals on the first frequency channel to the remote receiver by a plurality of auxiliary optical transmitter front ends of the transmitter; wherein the beacon signals sent by the main and the auxiliary optical transmitter front ends are used to assist a beam alignment procedure between the main optical transmitter front end and the remote receiver for data communication; and generating individual beacon signals for the main and the plurality of auxiliary optical transmitter front ends according to a synchronous CDMA method, with each beacon signal comprising a unique identifier corresponding to the main and the plurality of auxiliary optical transmitter front ends respectively; wherein there is an overlap between coverage areas of the main and the auxiliary optical transmitter front ends, with the combined coverage areas centered at the coverage area of the main optical transmitter front end.

In accordance with a fifth aspect of the invention a method of a receiver is provided. A method of a receiver in an optical wireless communication system, the method comprises the receiver receiving data on a first frequency band by a rotatable optical receiver front end of the receiver from a remote transmitter for data communication, and detecting, by the rotatable optical receiver front end, one or more beacon signals sent by the remote transmitter on a first frequency channel according to a synchronous CDMA method, with each beacon signal comprising a unique identifier corresponding to a main optical transmitter front end or one or more auxiliary optical transmitter front ends of the remote transmitter respectively; and assisting a control on adjusting the rotatable optical receiver front end to align with the remote transmitter for data communication according to the detection of the one or more beacon signals.

The invention may further be embodied in a computer program comprising code means which, when the program is executed by a transmitter comprising processing means, cause the processing means to carry out the method of the transmitter as disclosed in the present invention.

The invention may further be embodied in a computer program comprising code means which, when the program is executed by a receiver comprising processing means, cause the processing means to carry out the method of the receiver as disclosed in the present invention.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

DETAILED DESCRIPTION OF EMBODIMENTS

The embodiments set forth below represent information to enable those skilled in the art to practice the embodiments and illustrate the best mode of practicing the embodiments. Upon reading the following description in light of the accompanying drawings, those skilled in the art will understand the concepts of the disclosure and will recognize applications of these concepts not particularly addressed herein. It should be understood that these concepts and applications fall within the scope of the disclosure.

Figure 1:
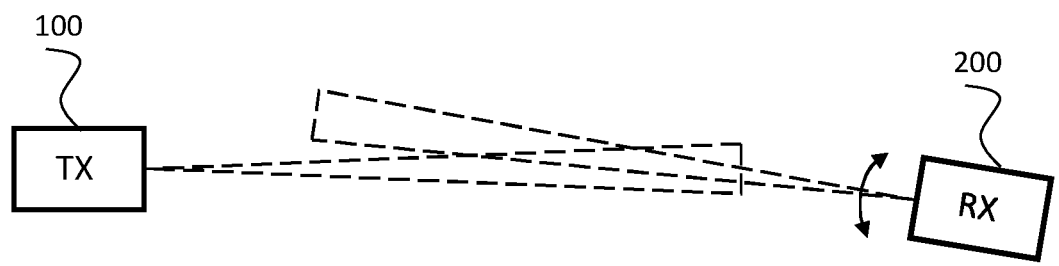
FIG. 1 demonstrates beam alignment in an optical wireless communication system.

FIG. 1 demonstrates beam alignment in an optical wireless communication system comprising a transmitter 100 and a remote receiver 200. The pair of remote communication devices 100, 200 operate at an optical band, such as in visible light, Ultraviolet (UV), and Infrared (IR) spectra. Point-to-point Li-Fi or optical wireless systems are usually narrow angle systems. The beam angle between two remote receivers is typically not larger than 20 degrees, or 10 degrees half angle. To support high data rate and long distance (tenths to hundreds of meters) communication, the beam angle may be in the order of 1 to 5 degrees half-angle.

In order to establish a stable communication with a high throughput, both devices need to be facing each other and be properly aligned. This can be quite challenging in practice, due to the combination of a narrow beam and a large separation. Usually this is done by installing one device in a fixed position, while the other one is installed on some type of mounting device that allows it to rotate in one or more axis to find the correct alignment. The alignment can be implemented either manually or automated using servos, stepper motors, or another type of actuators. In this example, the transmitter 100 is assumed to be the fixed one, and the remote receiver 200 as the rotatable one that needs to align to the beam with the transmitter.

Figure 2:
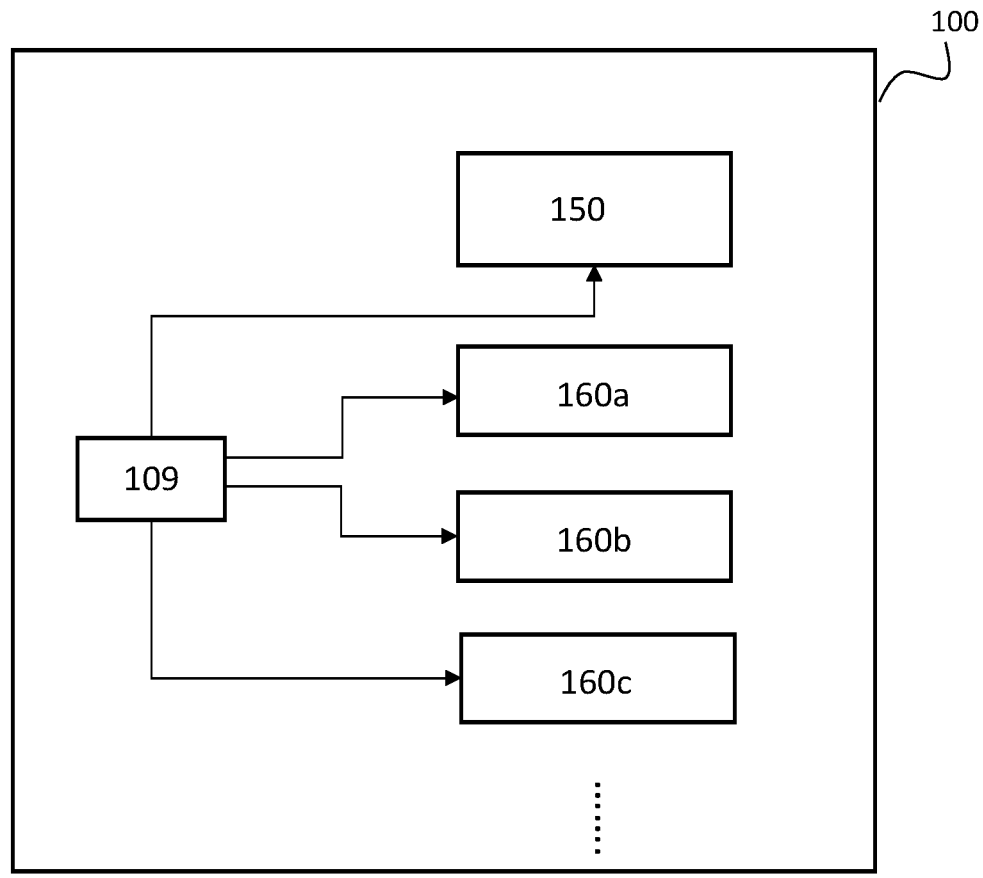
FIG. 2 illustrates basic components of a transmitter.

FIG. 2 illustrates basic components of a transmitter 100. As a basic setup, the transmitter 100 comprises a main optical transmitter front end 150, a plurality of auxiliary optical transmitter front ends 160a, 160b, 160c, and a first controller 109. The main optical transmitter front end 150 is configured to carry out two different assignments. The first one is to send data on a first frequency band to a remote receiver 200 for data communication; and the second one is to assist a beam alignment between the main optical transmitter front end 150 and the remote receiver 200 for data communication by sending one or more beacon signals on a first frequency channel to the remote receiver 200. The plurality of auxiliary optical transmitter front ends 160a, 160b, 160c are configured to assist the beam alignment procedure by sending beacon signals on the first frequency channel to the remote receiver 200. The first controller (109) is configured to generate individual beacon signals for the main optical transmitter front end 150 and the plurality of auxiliary optical transmitter front ends 160a, 160b, 160c according to a synchronous CDMA method. Each beacon signal comprises a unique identifier corresponding to the main optical transmitter front end 150 and the plurality of auxiliary optical transmitter front ends 160a, 160b, 160c respectively.

Figure 3:
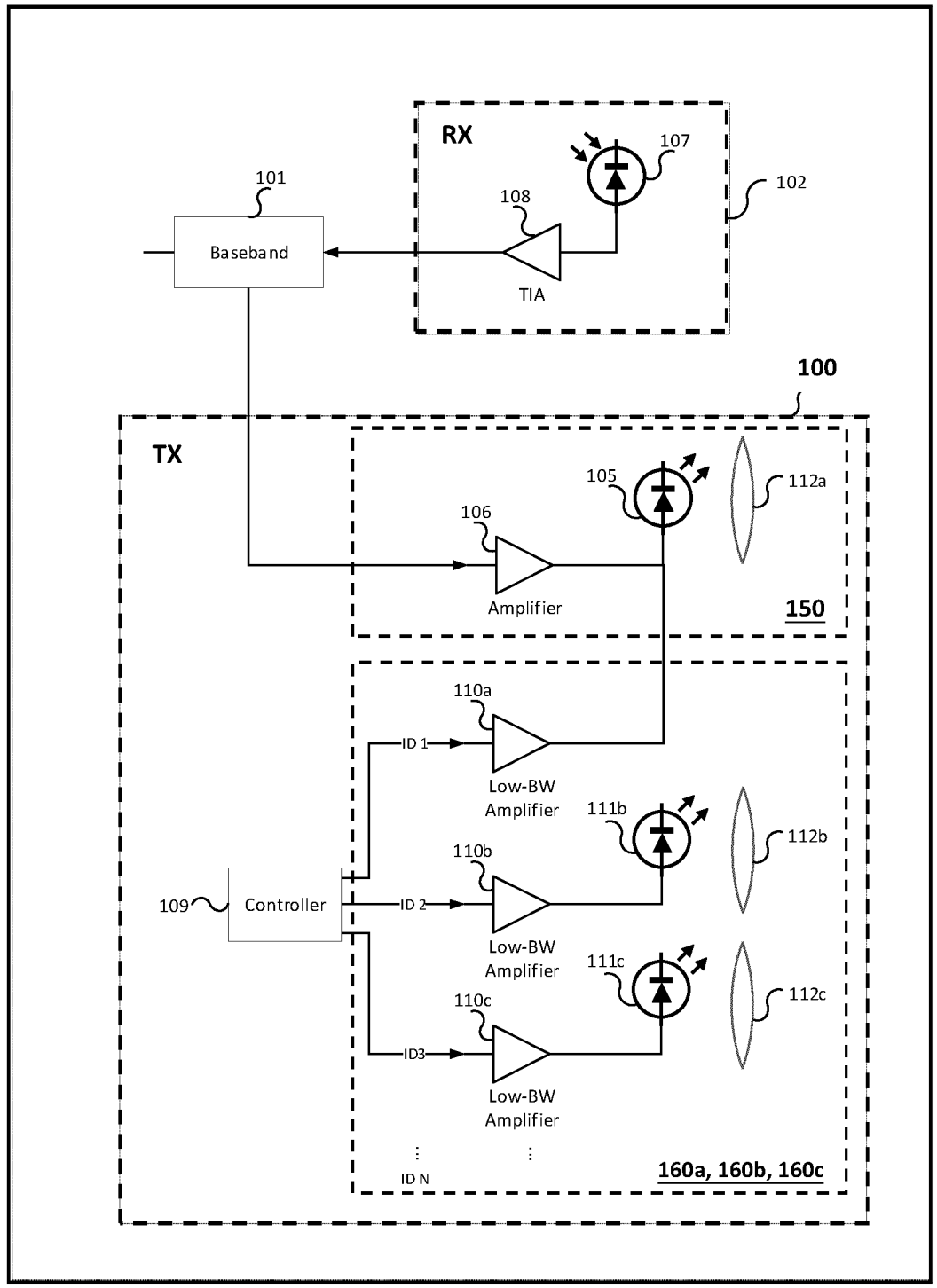
FIG. 3 demonstrates an example of a transceiver comprising a disclosed transmitter.

FIG. 3 demonstrates an example of a transceiver comprising a transmitter 100 as disclosed in the present invention. The transceiver comprises a baseband module 101, a local receiver 102, and a transmitter 100. The baseband module 101 is configured to support high speed data communication by connecting to the transmitter 100 and the local receiver 102 for modulation and demodulation, respectively. On the other side, the baseband module 101 may be connected to Ethernet or another communication port to provide the connection between the optical wireless communication system and an external network. The local receiver 102 comprises at least a photodiode (PD) 107 and a trans-impedance amplifier (TIA) 108 connected between the photodiode 107 and the baseband module 101. Sometimes a photodiode is also called as a photo detector, a light detector, or a photo sensor.

For the transmitter 100, the main optical transmitter front end 150 further comprises a light source 105, which may be one of a light-emitting diode (LED), a laser diode, a vertical-cavity surface-emitting laser (VCSEL), and an amplifier 106 connected between the light source and the baseband module 101. The transmitter 100 further comprises a plurality of auxiliary optical transmitter front ends 160a, 160b, 160c. Each auxiliary optical transmitter front end 160a, 160b, 160c comprises a low-bandwidth amplifier 110a-c and a light source 111b-c. the light source 111b-c may be a LED or a laser diode. The first controller 109 may be a low-cost controller or a microcontroller, which is configured to generate different CDMA beacons for the main optical transmitter front end 150 and the plurality of auxiliary transmitter front ends 160a, 160b, 160c. Each beacon signal comprises a different identifier or ID code, and is fed individually to a separate frontend 105, 111b-c. The first of the beacon signals may be coupled to the main optical transmitter front end 150, while the rest are coupled to the auxiliary optical transmitter front ends. By using different lenses (112a-c) for each of the separate beacons, an arrangement of overlapped beam patterns can be used to assist with the identification of the area in space where the receiver is pointing to. This is achieved by exploiting the characteristics of CDMA codes.

In a CDMA system, binary bits are represented by (−1, +1). A message of length n is spread by a code (chip sequence) of length N by multiplying each bit message for the full sequence. This generates a transmitted message of length n×N. Each beacon signal is encoded by a different chip sequence, which is statistically uncorrelated. The chip duration is constant, and it is the same for all the chip sequences. When the encoded sequences are mixed in the overlapped area, a remote receiver 200 can decode simultaneously the original messages received from different light sources 105, 111b-c by cross-correlating the received signal with the same set of N-chip sequences used for encoding the messages. This will produce a peak in the correlation result when part of the signal matches a chip sequence.

To simplify the implementation, it is beneficial to generate beacon signals by encoding a single bit with different chip sequences, producing messages of length N. Hence, the different chips sequences are the unique identifiers to distinguish different optical front ends, or the unique identifiers are used as spreading codes according to a CDMA method.

Figure 4:
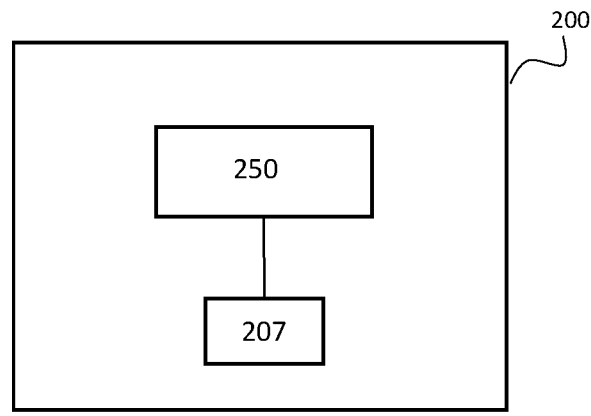
FIG. 4 illustrates basic components of a receiver.

FIG. 4 illustrates basic components of a receiver 200. The receiver 200 comprises a rotatable optical receiver front end 250 and a second controller 207. The rotatable optical receiver front end 250 is configured to carry out two assignments. The first one is to receive data on a first frequency band from a remote transmitter 100 for high-speed data communication. The second one is to assist beam alignment by detecting one or more beacon signals sent by the remote transmitter 100 on a first frequency channel according to a synchronous CDMA method. Each beacon signal may comprise a unique identifier corresponding to a main optical transmitter front end 150 or one or more auxiliary optical transmitter front ends 160a, 160b, 160c of the remote transmitter 100 respectively. The second controller 207 is configured to assist a control on adjusting the rotatable optical receiver front end 250 to align with the remote transmitter 100 for data communication according to the detection of the one or more beacon signals.

Note that for the receiver 200, at least the optical receiver front end 250 is rotatable. It may also be the case that the entire receiver 200 is implemented as a rotatable unit, and then the control of adjusting position will be applied to the receiver 200 as a whole.

In a first option, the actual alignment may be implemented automatically via servos, stepper motors, or another type of actuators connected to the receiver or the rotatable optical receiver front end 250. The control signal generated by the second controller 207 may be provided directly to control the servos, stepper motors, or another type of actuators. In a second option, the actual alignment may be implemented manually by a user. Then, the control signal may be used as a visual or audio aid to the user, such as showing an instruction on a screen or providing a voice instruction.

Figure 5:
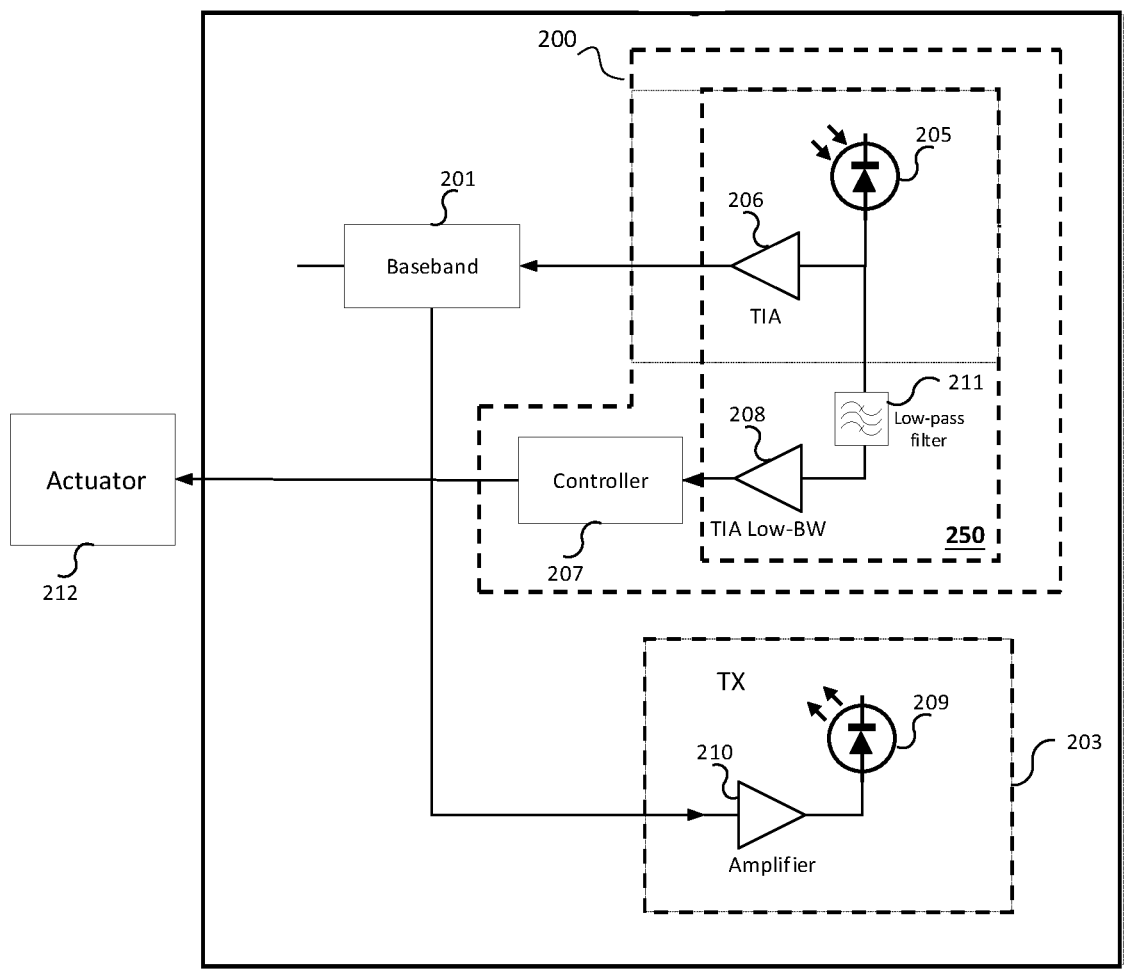
FIG. 5 demonstrates an example of a transceiver comprising a disclosed receiver.

FIG. 5 demonstrates an example of a transceiver comprising a receiver 200 as disclosed according to the present invention. The transceiver comprises a baseband module 201, a local transmitter 203, and a receiver 200. The baseband module 201 is configured to support high speed data communication by connecting to the transmitter 203 and the receiver 200 for modulation and demodulation, respectively. On the other side, the baseband module 201 may be connected to Ethernet or another communication port to provide the connection between the optical wireless communication system and an external network. The local transmitter 203 comprises a light source 209 and an amplifier 210 connected between the light source 209 and the baseband module 201. The receiver 200 comprises an optical front end 250 and a second controller 207. The receiver optical front end 250 further comprises a photo detector or a photodiode 205, a first trans-impedance amplifier (TIA) 206, a low-pass filter 211, and a second low-bandwidth TIA 208. The first TIA 206 is connected to the photodiode 205 forming a first receiving path. The low pass filter 211 is connected between the photodiode 205 and the second TIA 208 forming a second receiving path. The first receiving path is configured to receive communication data, and the second receiving path is configured to detect presence of one or more beacon signals. The output of the second low-bandwidth TIA 208 is fed to a controller 207. The controller 207 may be a low-cost controller (e.g., microcontroller). The controller may also comprise an ADC to convert analog output from the second TIA 208 to digital signals. If ADC is not combined in the controller, there may be an external ADC connected between the second TIA 208 and the controller 207. The controller 207 will extract all the detected beacons by cross correlating the received signal with all possible chip sequences (IDs). The amplitudes of the correlation peaks represent the signal strengths of beacons related to different IDs. The comparison of the signal strengths related to different IDs can indicate the possible area or segment where the receiver is pointing to, allowing the controller 207 to derive a control signal on adjusting the rotating unit to move towards the correct alignment. This information is then passed to either an external feedback system (e.g., a screen, a LED indicator array, a speaker) for manual adjustment or to an automated rotating system (e.g., servo, stepper motors, etc.) 212.

To assist the beam alignment procedure between the two remote devices 100, 200, from the transmitter side 100 it is necessary to have an overlap between coverage areas of the main optical transmitter front end 150 and the plurality of auxiliary optical transmitter front ends 160a, 160b, 160c. Furthermore, the combined coverage areas shall be centered at the coverage area of the main optical transmitter front end 150. Different arrangements of the main optical transmitter front end 150 and the plurality of auxiliary optical transmitter front ends 160a, 160b, 160c are possible.

Figure 6:
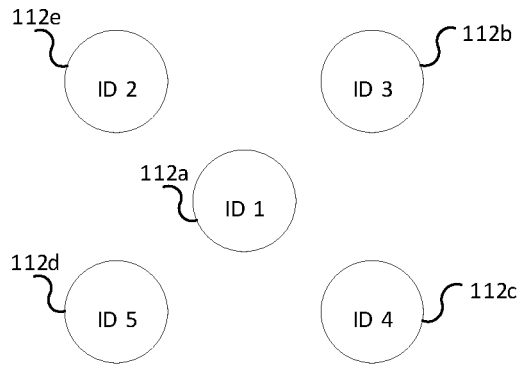
FIG. 6 demonstrates an arrangement of a main optical transmitter front end and a plurality of auxiliary optical transmitter front ends.

FIG. 6 demonstrates one arrangement of the main optical transmitter front end 150 and the plurality of auxiliary optical transmitter front ends 160a, 160b, 160c. The circle with ID1 indicates the placement of lens 112a of the main optical transmitter front end 150, while the circles with ID2-ID5 indicate the placement of lenses 112b, 112c, 112d, 112e of the four auxiliary optical transmitter front ends. It is intended to use the plurality of auxiliary optical transmitter front ends (160a, 160b, 160c) are configured to generate equal coverage area sections around an optical axis centered by the coverage area of the main optical transmitter front end (150), with a partial overlap between any two adjacent sections.

In this example, the lens 112a of the main optical transmitter front end 150 is placed at the center, which is used for both the high-speed data transmission and the low-speed out-of-band beacon transmission. The lenses 112b, 112c, 112d, 112e of the four auxiliary optical transmitter front ends are arranged around the center. In this example, each of these lenses of the auxiliary optical transmitter front ends shapes the beam to cover a slightly larger area than ¼ of the surrounding perimeter. Hence, there is always an overlap between any two adjacent coverage area sections generated by the auxiliary optical transmitter front ends.

Figure 7:
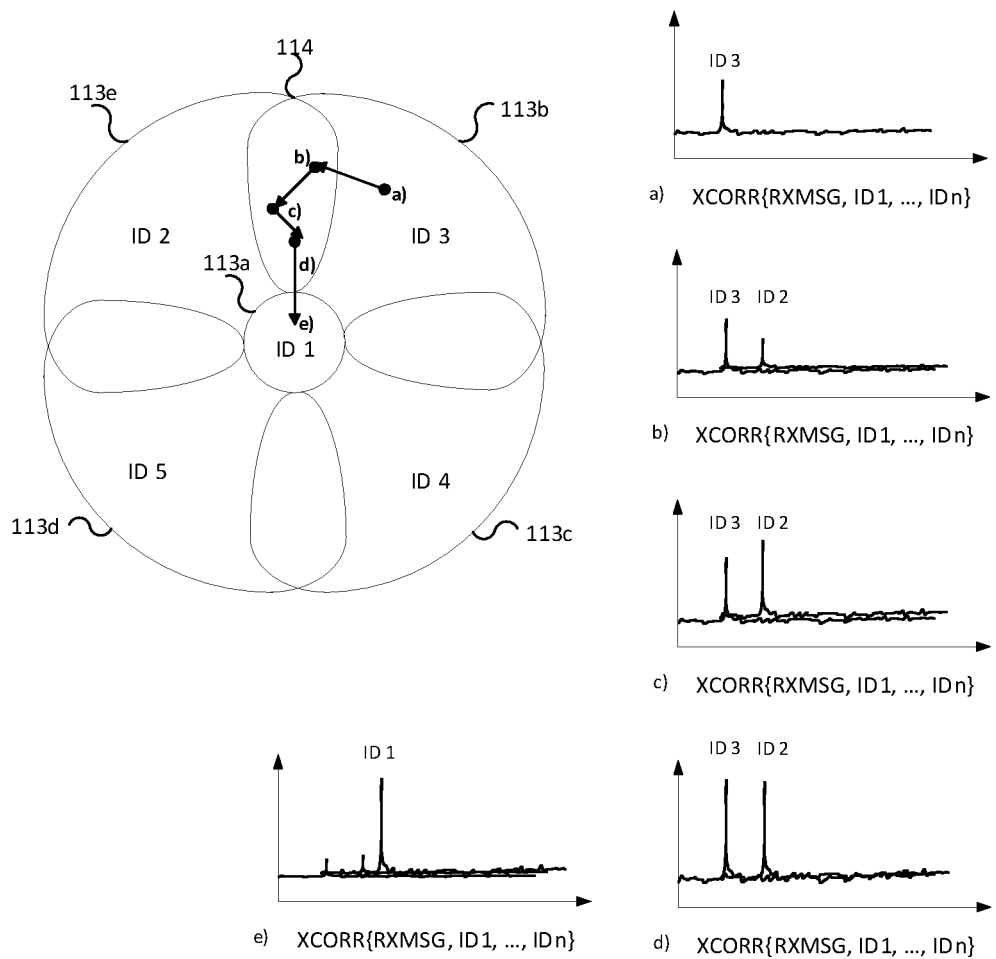
FIG. 7 illustrates an example of received beam patterns and beam alignment path.

Related to the arrangement shown in FIG. 6 at the transmitter 100 side, FIG. 7 illustrates an example of corresponding received beam patterns and beam alignment path at the remote receiver 200 side. The coverage areas created by 112a-e are shown as 113a-e respectively at the receiver side. The partial overlap area between the coverage area of two adjacent auxiliary optical transmitter fronts is indicated as 114. The figure shows an example of an alignment path that the receiver 200 or the rotatable optical receiver front end 250 would follow when it starts pointing at a random area in space.

In this example, the starting point a) is located in the area covered by ID3 only. The tracking path followed from a) to e) is controlled by the controller 207 derived from the cross-correlation results as depicted in the plots to the right for each point. After performing cross correlation between the received signal at the initial point a) and the set of unique identifiers or IDs, the controller may control the receiver 200 or the rotatable optical receiver front end 250 to make a random or predefined movement/rotation towards a specific direction. When reaching point b), the relative information on the strength of the IDs received in point a) to point b) will indicate if the receiver is moving away from the center or not. After moving to point c) and d), it can be derived by the controller 207 that it is "travelling" towards the center. The beams of the auxiliary optical transmitter front ends are arranged to be stronger when it is closer to the center. The radiation patterns may be achieved with the aid of customized lenses. Upon detecting two IDs indicating the area of overlap 114 and a comparison between the amplitudes of correlations results related to the two IDs, the controller 207 can signal the direction to move. Finally, when the receiver starts to detect ID 1 in point e), the system is already in the narrow reception beam that it shares with the main signal, then it can perform small alignment movements around this area until it settles on the highest peak of ID 1.

Figure 8:
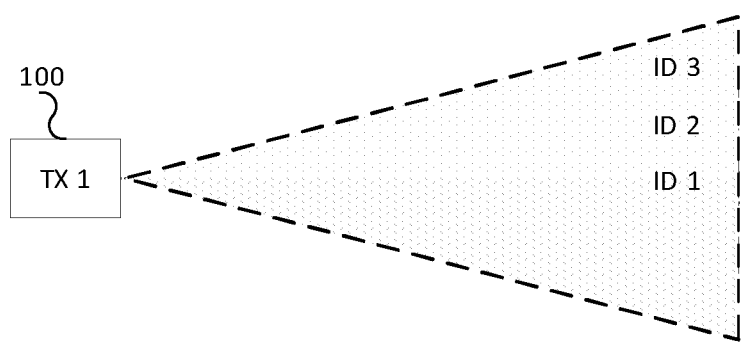
FIG. 8 demonstrates another arrangement of a main optical transmitter front end and a plurality of auxiliary optical transmitter front ends.

FIG. 8 demonstrates a side view of another arrangement of the main optical transmitter front end 150 and the plurality of auxiliary optical transmitter front ends 160a, 160b, 160c. In this example, all the auxiliary optical transmitter front ends are clustered at the center. Beacons with ID1 are sent by the main optical transmitter front end 150, which is configured to support high-speed data communication as well. The other IDs are sent by the auxiliary optical transmitter front ends, which have the same beam pattern as the main optical transmitter front end 150 but with a wider angle. As an example, ID1 may be sent with a beam angle of 5 degrees, ID2 may be sent with a beam angle of 15 degrees, and ID3 may be sent with a beam angle of 35 degrees. Therefore, the plurality of auxiliary optical transmitter front ends 160a, 160b, 160c are configured to generate concentric overlapped coverage areas.

Figure 9:
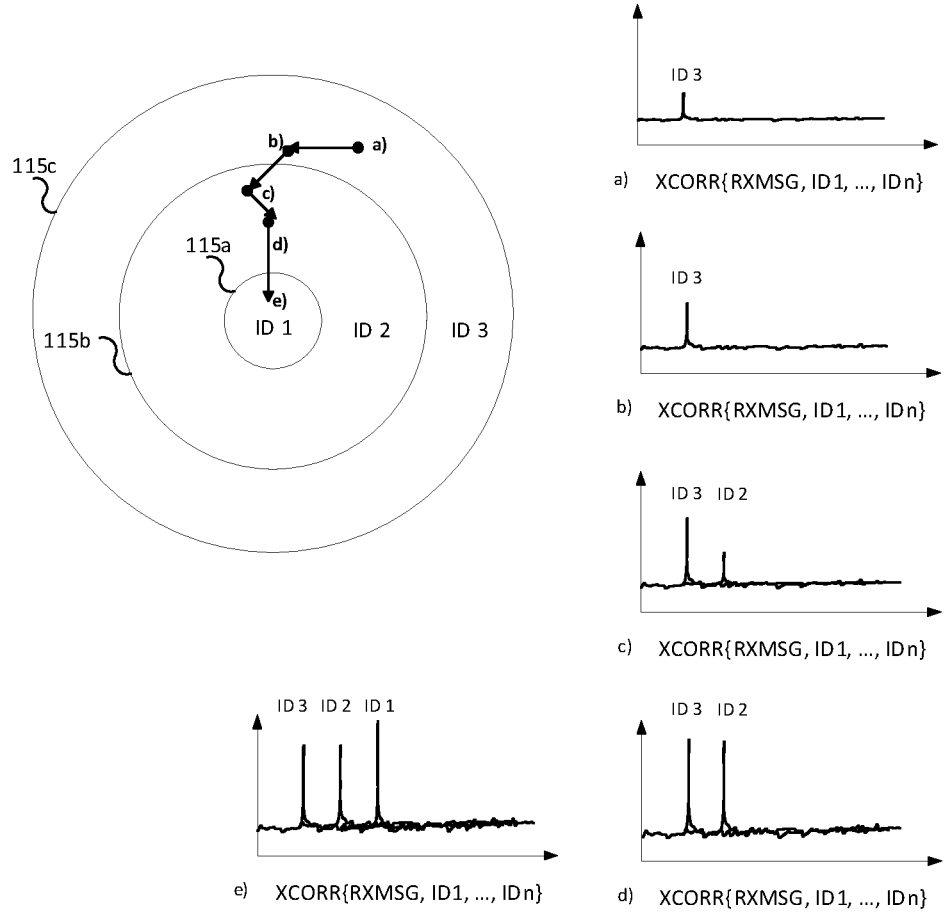
FIG. 9 illustrates another example of received beam patterns and beam alignment path.

Related to the arrangement shown in FIG. 8 at the transmitter 100 side, FIG. 9 illustrates another example of corresponding received beam patterns and beam alignment path at the remote receiver 200 side. Similar to the previous arrangement, the receiver points initially to point a), and finds its way to the center of the beam by analyzing the strengths of correlation peaks related to each ID. In this case, the coverage area of ID 1 115a contains part of the coverage areas of ID 2 and ID 3 115b, 115c, and the coverage area of ID2 115b contains part of the coverage area of ID3 115c and the entire coverage of ID1 115a. The light sources of the auxiliary optical transmitter front ends are configured in the manner that the intensity grows towards the center. If with a specific movement any of the IDs are detected with less strength than in the previous point, the system then needs to correct that specific movement to find again an increase in correlation results.

The number of required auxiliary optical transmitter front ends depends on the radiation patterns of these front ends. This can be explained by using the example shown in FIG. 9. When the beam alignment procedure starts at the starting point a), the detected signal strength of beacons with ID3 shall also grow steep towards the center. When the radiation pattern is flattening with the emitter of beacons with ID3, a new source, which shows again a steep growth towards the center of that region, may be needed to simplify the control of the controller or to avoid extra iterations. In this example, the next source is signaled by beacons with ID2. With CDMA, the signal strength of beacons with ID2 can be detected independently from other sources, such as beacons with ID3. Again, when beacons with ID2 starts flattening, another source is needed, which is ID1 in this example. Therefore, it is preferred that the alignment algorithm always uses the detected IDs with the lowest index number. In this manner, the obtained information provides maximum resolution.

Figure 10:
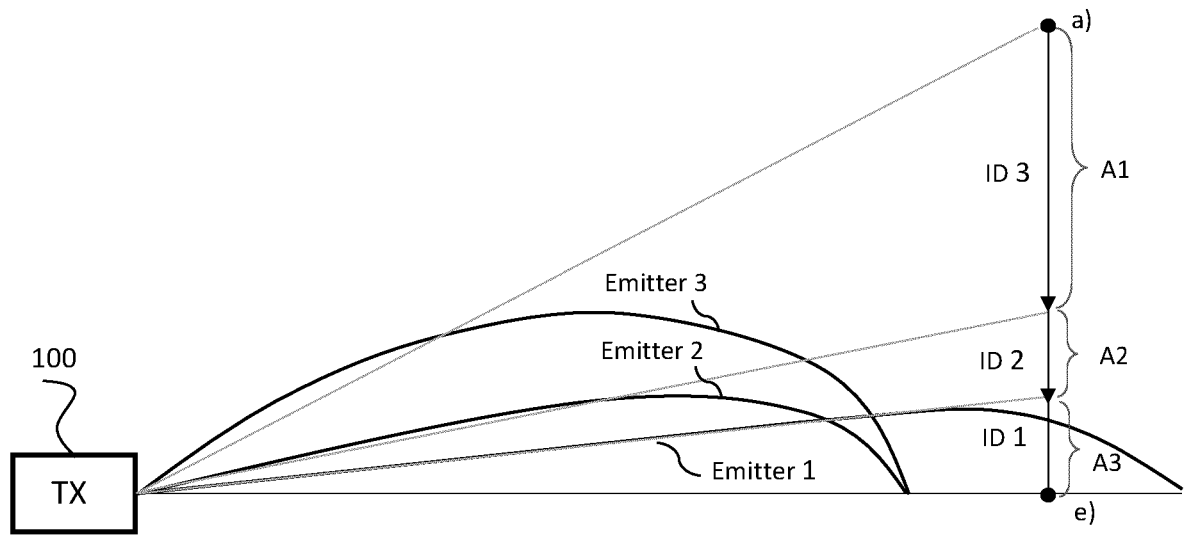
FIG. 10 illustrates an example of an alignment procedure in combination with polar emission patterns.

FIG. 10 summarizes the alignment procedure in combination with polar emission patterns for each emitter. The radiation patterns of emitter 1-3 are shown as the three curves in the figure, which sends ID1-3 respectively. The projected coverage area at the remote receiver side is split into three sections A1-A3. When the receiver is pointed in the area of A1, only ID3 can be detected. When the receiver is pointed in the area of A2, both ID2 and ID3 can be detected. However, in order to speed up the beam alignment procedure, it is preferrable to use the strongest IDs when there are more than one available. Therefore, in region A2, the controller will mainly track the strength of ID2, and in region A3 the controller will mainly track the strength of ID1. Therefore, at the end point e), the correlation peak related to ID1 will be maximized, which represents a precise alignment.

Figure 11:
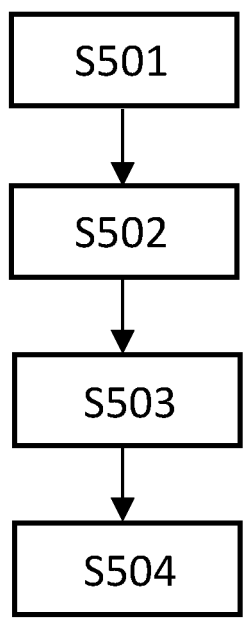
FIG. 11 shows a flow chart of a method of a transmitter.

FIG. 11 shows a flow chart of a method 500 of a transmitter 100. The method 500 comprises the transmitter 100: in step S501, sending data on a first frequency band to a remote receiver 200 for data communication by a main optical transmitter front end 150 of the transmitter 100; and sending, in step S503 a beacon signal on a first frequency channel to the remote receiver 200 by the main optical transmitter front end 150; sending, in step S504, beacon signals on the first frequency channel to the remote receiver 200 by a plurality of auxiliary optical transmitter front ends 160a, 160b, 160c of the transmitter 100; wherein the beacon signals sent by the main and the auxiliary optical transmitter front ends 160a, 160b, 160c are used to assist a beam alignment procedure between the main optical transmitter front end 150 and the remote receiver 200 for data communication. The method 500 further comprises a step S502 of generating individual beacon signals for the main 150 and the plurality of auxiliary optical transmitter front ends 160a, 160b, 160c according to a synchronous CDMA method, with each beacon signal comprising a unique identifier corresponding to the main and the plurality of auxiliary optical transmitter front ends 160a, 160b, 160c respectively; wherein there is an overlap between coverage areas of the main and the auxiliary optical transmitter front ends 160a, 160b, 160c) with the combined coverage areas centered at the coverage area of the main optical transmitter front end 150.

Figure 12:
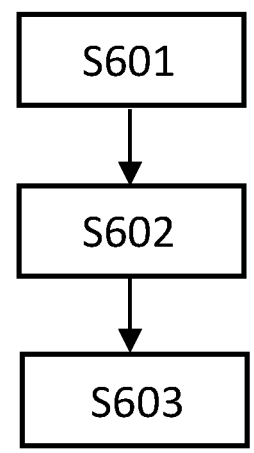
FIG. 12 shows a flow chart of a method of a receiver.

FIG. 12 shows a flow chart of a method 600 of a receiver 200. The method 600 comprises the receiver 200: in step S601, receiving data on a first frequency band by a rotatable optical receiver front end 250 of the receiver from a remote transmitter 100 for data communication, and in step S602, detecting, by the rotatable optical receiver front end 250, one or more beacon signals sent by the remote transmitter 100 on a first frequency channel according to a synchronous CDMA method, with each beacon signal comprising a unique identifier corresponding to a main optical transmitter front end 150 or one or more auxiliary optical transmitter front ends 160a, 160b, 160c of the remote transmitter 100 respectively; and in step S603, assisting a control on adjusting the rotatable optical receiver front end 250 to align with the remote transmitter 100 for data communication according to the detection of the one or more beacon signals.

The methods according to the invention may be implemented on a computer as a computer implemented method, or in dedicated hardware, or in a combination of both.

Executable code for a method according to the invention may be stored on computer/machine readable storage means. Examples of computer/machine readable storage means include non-volatile memory devices, optical storage medium/devices, solid-state media, integrated circuits, servers, etc. Preferably, the computer program product comprises non-transitory program code means stored on a computer readable medium for performing a method according to the invention when said program product is executed on a computer.

Methods, systems, and computer-readable media (transitory and non-transitory) may also be provided to implement selected aspects of the above-described embodiments.

The terms "program" or "computer program" are used herein in a generic sense to refer to any type of computer code (e.g., software or microcode) that can be employed to program one or more processors or controllers.

The invention claimed is:

1. A transmitter for use in an optical wireless communication system, the transmitter comprising:
   a main optical transmitter front end configured to:
     send data on a first frequency band to a remote receiver for data communication; and
     send a beacon signal on a first frequency channel to the remote receiver;
   a plurality of auxiliary optical transmitter front ends configured to send beacon signals on the first frequency channel to the remote receiver; wherein the beacon signals sent by the main and the auxiliary optical transmitter front ends are used to assist a beam alignment procedure between the main optical transmitter front end and the remote receiver for data communication; and
   a first controller configured to generate individual beacon signals for the main and the plurality of auxiliary optical transmitter front ends according to a synchronous CDMA method, with each beacon signal comprising a unique identifier corresponding to the main and the plurality of auxiliary optical transmitter front ends respectively;
   wherein there is an overlap between coverage areas of the main and the auxiliary optical transmitter front ends, and the combined coverage areas are centered at the coverage area of the main optical transmitter front end.

2. The transmitter of claim 1, wherein the first frequency channel is outside the first frequency band.

3. The transmitter of claim 1, wherein the main optical transmitter front end has a beam angle not larger than 20 degrees, and each auxiliary optical transmitter front end has a beam angle larger than that of the main optical transmitter front end.

4. The transmitter of claim 1, wherein the plurality of auxiliary optical transmitter front ends comprises at least three auxiliary optical transmitter front ends.

5. The transmitter of claim 1, wherein a coverage area of each auxiliary optical transmitter front end has an overlap with at least one other auxiliary optical transmitter front end.

6. The transmitter of claim 1, wherein the first controller is configured to use the unique identifiers as spreading codes according to the CDMA method to generate beacon signals for the main and the auxiliary optical transmitter front ends, respectively.

7. The transmitter of claim 1, wherein the plurality of auxiliary optical transmitter front ends is configured to generate concentric overlapped coverage areas.

8. The transmitter of claim 1, wherein the plurality of auxiliary optical transmitter front ends is configured to generate equal coverage area sections around an optical axis centered by the coverage area of the main optical transmitter front end, with a partial overlap between any two adjacent sections.

9. An optical wireless communication system comprising a transmitter according to claim 1 and a receiver, the receiver comprising:
a rotatable optical receiver front end configured to:
receive data on a first frequency band from a remote transmitter for data communication, and
detect one or more beacon signals sent by the remote transmitter on a first frequency channel according to a synchronous CDMA method, with each beacon signal comprising a unique identifier corresponding to a main optical transmitter front end or one or more auxiliary optical transmitter front ends of the remote transmitter respectively; and
a second controller configured to assist a control on adjusting the rotatable optical receiver front end to align with the remote transmitter for data communication according to the detection of the one or more beacon signals.

10. A receiver for use in an optical wireless communication system, the receiver comprising:
a rotatable optical receiver front end configured to:
receive data on a first frequency band from a remote transmitter for data communication, and
detect one or more beacon signals sent by the remote transmitter on a first frequency channel according to a synchronous CDMA method, with each beacon signal comprising a unique identifier corresponding to a main optical transmitter front end or one or more auxiliary optical transmitter front ends of the remote transmitter respectively; and
a second controller configured to assist a control on adjusting the rotatable optical receiver front end to align with the remote transmitter for data communication according to the detection of the one or more beacon signals.

11. The receiver of claim 10, wherein the rotatable optical receiver front end comprises:
a photodiode;
a first transimpedance amplifier, TIA, connected to the photodiode forming a first receiving path;
a low pass filter connected to the photodiode;
a second TIA connected to the low pass filter forming a second receiving path;
wherein the first receiving path is configured to receive communication data, and the second receiving path is configured to detect presence of one or more beacon signals.

12. The receiver of claim 10, wherein the second controller is configured to:
a) perform cross correlations between detected signals on the first frequency channel and each one of a set of unique identifiers corresponding to the main optical transmitter front end and a plurality of auxiliary optical transmitter front ends of the remote transmitter respectively;
b) generate, according to correlation results, a control signal for adjusting the rotatable optical receiver front end; and
c) repeat step a)-b) until the correlation result related to the unique identifier of the main optical transmitter front end larger than any other correlation results.

13. A method of a transmitter in an optical wireless communication system, the method comprising the transmitter:
sending data on a first frequency band to a remote receiver for data communication by a main optical transmitter front end of the transmitter; and
sending a beacon signal on a first frequency channel to the remote receiver by the main optical transmitter front end;
sending beacon signals on the first frequency channel to the remote receiver by a plurality of auxiliary optical transmitter front ends of the transmitter; wherein the beacon signals sent by the main and the auxiliary optical transmitter front ends are used to assist a beam alignment procedure between the main optical transmitter front end and the remote receiver for data communication; and
generating individual beacon signals for the main and the plurality of auxiliary optical transmitter front ends according to a synchronous CDMA method, with each beacon signal comprising a unique identifier corresponding to the main and the plurality of auxiliary optical transmitter front ends respectively;
wherein there is an overlap between coverage areas of the main and the auxiliary optical transmitter front ends, with the combined coverage areas centered at the coverage area of the main optical transmitter front end.

14. A non-transitory computer readable medium comprising instructions which, when the instructions are executed by a transmitter cause the transmitter to perform the method of claim 13.

15. A method of a receiver in an optical wireless communication system, the method comprising the receiver:
receiving data on a first frequency band by a rotatable optical receiver front end of the receiver from a remote transmitter for data communication, and
detecting, by the rotatable optical receiver front end, one or more beacon signals sent by the remote transmitter on a first frequency channel according to a synchronous CDMA method, with each beacon signal comprising a unique identifier corresponding to a main optical transmitter front end or one or more auxiliary optical transmitter front ends of the remote transmitter respectively; and
assisting a control on adjusting the rotatable optical receiver front end to align with the remote transmitter for data communication according to the detection of the one or more beacon signals.

* * * * *